May 21, 1968 R. F. HOLLE 3,384,781
SELF-CONTAINED BATTERY-POWERED ELECTRIC INCANDESCENT LAMP
Filed Oct. 31, 1966
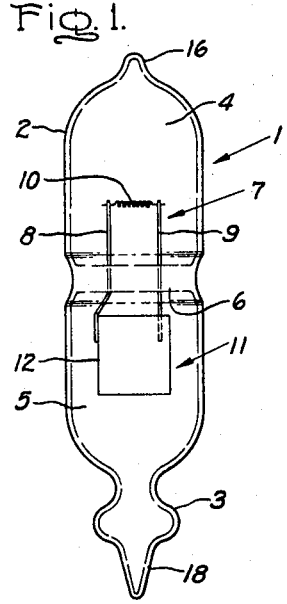
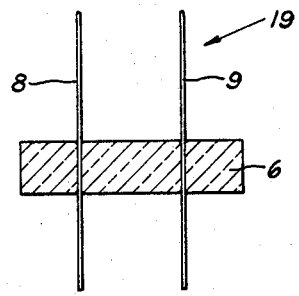
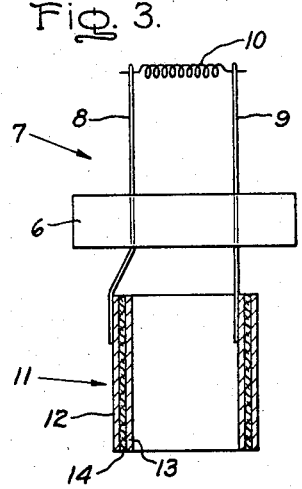
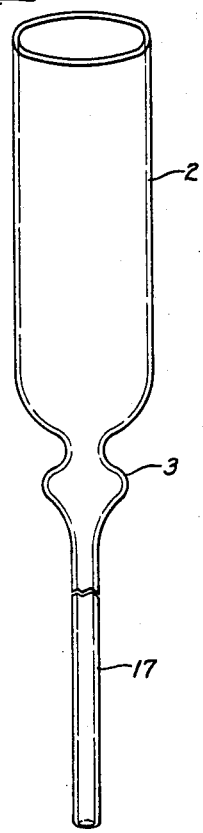
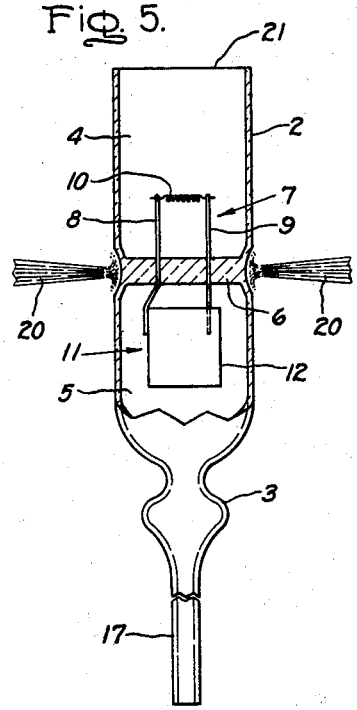
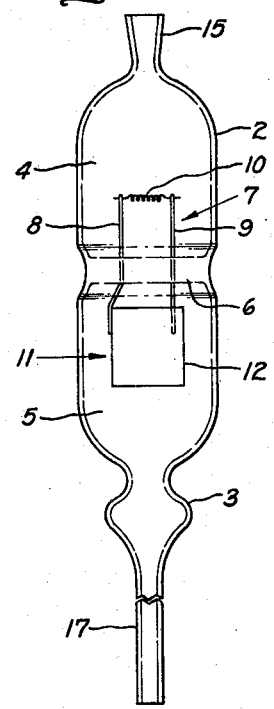
Inventor:
Robert F. Holle
by James G. Lepine
His Attorney

United States Patent Office 3,384,781
Patented May 21, 1968

3,384,781
SELF-CONTAINED BATTERY-POWERED
ELECTRIC INCANDESCENT LAMP
Robert F. Holle, Lyndhurst, Ohio, assignor to General
Electric Company, a corporation of New York
Filed Oct. 31, 1966, Ser. No. 590,795
6 Claims. (Cl. 315—33)

This invention relates in general to portable battery-powered electric lamps, more particularly to portable electric lamps powered by batteries of the deferred action type adapted to be stored dry and to be activated at times of use by immersion in water.

Deferred action batteries of the type which become activated by immersion in water are well known and as usually constructed comprise positive and negative electrodes spaced apart by a separator member of water pervious material, the two electrodes being of silver chloride and magnesium, respectively, or of other suitable materials which when immersed together in an electrolyte provide adequate electrical power output for the particular application. If the battery is to be used in salt water, the water will itself serve as an electrolyte. For fresh water use it normally is necessary to impregnate the electrode separator member during its manufacture with a salt capable of dissolving in fresh water to form a suitable electrolyte. Lamps of such water-activated battery-powered type are adapted to marine uses such, for example, as distress signals, life raft markers, exercise torpedo position indicators and other such uses in which it is desirable that the light source provide maximum light output and reliability of operation with minimum size and weight.

Because of the comparatively high moisture-absorbing characteristic of the porous insulating separator employed in the water-activated batteries of such deferred action battery type lamps, it has been generally necessary heretofore to store these lamps in dry atmospheres in order to keep them from becoming prematurely activated in environments of high humidity. This requirement necessarily has placed a limitation on the use of such battery-powered lamps.

It is an object of the invention, therefore, to provide an electric lamp of the self-contained water-activated battery-powered type which does not require storage in dry atmosphere, prior to intended use, in order to prevent premature activation thereof.

Another object of the invention is to provide an electric lamp of the self-contained water-activated battery-powered type which normally is in an inoperative condition and incapable of premature activation on exposure to high-humidity surrounding atmospheres but which can be quickly and easily transformed to its operative condition so as to be capable of immediate activation on immersion of the lamp in water.

A further object of the invention is to provide a portable electric light structurally combining in a sealed envelope an electric incandescent lamp and a deferred action battery capable of activation by immersion in water, and characterized by small size, light weight, reliability of operation, and ease and economy of manufacture.

A still further object of the invention is to provide a novel method of making an electric lamp of the self-contained water-activated battery-powered type.

Briefly stated, in accordance with one aspect of the invention, the water-activated deferred action battery of the self-contained battery-powered electric incandescent lamp is enclosed within a moisture-free hermetically sealed chamber portion of the lamp envelope which is separate from the filament-containing chamber portion thereof and is provided with a readily frangible section or tip end which, at the time of desired use of the lamp, can be quickly and easily broken to thereby expose the battery chamber to the surrounding atmosphere and permit the ingress of water thereinto for activation of the battery.

In accordance with a further aspect of the invention, the filament and the battery of a deferred action battery-powered electric lamp are mounted on the opposite ends of a pair of lead-in wires, sealed through a glass button or sealing disc, to thereby form a lamp mount which is then sealed within a tubular glass bulb, provided at one end with a ready-break tip end, by fusion-sealing the glass button to the inner wall of the tubular glass bulb so as to form a transverse partition therein dividing the tubular bulb into two separate chambers within which the filament and the battery are respectively located. The two chambers of the glass bulb are then evacuated through the open ends of the bulb and, if desired, filled with a suitable gas, following which the tube ends are then sealed off to hermetically seal the bulb chambers and complete the fabrication of the lamp.

Further objects and advantages of the invention will appear from the following detailed description of a species thereof and from the accompanying drawings.

In the drawings,

FIG. 1 is an elevation of a battery-powered electric lamp according to the invention;

FIG. 2 is a sectional view of the lamp stem employed in fabricating the mount structure of the lamp according to the invention;

FIG. 3 is an elevation of the lamp mount with the battery of the mount shown in section;

FIG. 4 is a perspective view of the tubulated glass bulb blank from which the lamp bulb or envelope is fabricated;

FIG. 5 is a sectional view, partly in elevation, showing the sealing of the lamp mount into the glass bulb, and FIG. 6 is an elevation of the sealed lamp mount and bulb assembly showing the necking down of the open end of the filament chamber portion of the bulb to form an exhaust tubulation thereon.

Referring to the drawing, the self-contained battery-powered electric lamp 1 there shown comprises a hermetically sealed tubular glass bulb 2 provided at one end with a readily frangible, or so-called "ready-break" tip section 3 such as, for instance, that commonly employed on ampoules by the medical profession to store drugs and chemicals. The bulb 2 is divided into two separate chambers 4 and 5 by a transverse glass wall or partition constituted by the disc-shaped glass button 6 of a lamp mount 7 sealed within the bulb. The glass button 6 is sealed around its entire circular periphery to the inner wall of the bulb 2 so as to hermetically seal off the two chambers 4 and 5 from one another. A pair of lead-in wires 8 and 9 are sealed through the glass button 6 of the lamp mount 7 in spaced side-by-side relation and protrude from the opposite sides of the button.

Mounted within the chamber portion 4 of the bulb 2 is a filament 10 such as a tungsten wire coil. The filament 10 constitutes the light source of the lamp 1 and it is connected at its opposite ends to respective ones of the lead-in wires 8, 9.

Mounted within the chamber portion 5 of the bulb provided with the ready-break tip section 3 is a deferred action battery 11 for supplying electric powder to the filament 10 to energize the same. The battery 11 may be of any suitable water-activated type such as is commonly employed as a source of electric power when immersed in water. In the particular case illustrated (FIG. 3), the battery 11 is comprised of generally tubular positive and negative electrodes 12 and 13, respectively, telescoped one within another in concentrically nested relation and separated by a porous insulating separator 14 which may be of nylon, fiber glass or threads of other non-conductive material woven to form a porous cylindrical tube or sleeve. Other separators such as glass beads partially embedded in the surface of one or both electrodes 12, 13 or plain nylon, glass, cotton or other threads arranged generally parallel to the longitudinal axis of the tubular electrodes 12, 13, may be used instead, if desired. Regardless of the particular separator construction employed, the separator 14 acts as a spacer and insulator between the outer and inner battery electrodes 12 and 13, and because of its porous construction, it permits free passage of ions through the electrolyte and allows the escape of any hydrogen gas generated by the battery reaction.

The positive and negative electrodes 12 and 13 of the battery 11 preferably are composed of silver chloride and magnesium, respectively, as this combination of electrode materials has been found to yield high wattage output when used with salt water as electrolyte. Also, both these materials may readily be shaped into tubular form and when so shaped provide adequate structural strength without backing or other support structures. It is to be understood, however, that other electrode combinations such, for example, as magnesium and copper chloride, may successfully be utilized in the battery and bulb assemblies of my invention, the only essential requirement being that the materials provide a satisfactory electrical power output when immersed together in a suitable electrolyte. As shown in FIG. 3, the two electrodes 12, 13 of the battery 11 are suitably connected, as by soldering or brazing, to respective ones of the lead-in wires 8, 9. The electrical power generated by the battery 11, on immersion in water, is thus conducted by the wires 8, 9 to the filament 10 for the purpose of energizing it.

As noted above, for salt water applications the water itself serves as a satisfactory electrolyte for the magnesium and silver chloride electrodes described. For fresh water use, the separator 14 may be impregnated during fabrication with a salt capable of dissolving in water to form a suitable electrolyte. Sodium chloride and potassium chloride are exemplary of the many salts which may be used for this purpose, the separator 14 being impregnated with one or more of these salts as by immersion in a concentrated solution of the salt. The separator 14 should be of a material capable of retaining a quantity of the salt sufficient to provide adequate electrolyte for the expected service life of the battery unit 11 when immersed in water.

The rated voltage, amperage and service life of the lamp filament 10 should be properly matched to the battery electrode unit 11 to be connected to it. Battery voltage is determined by the electrode materials used and by the number of cells incorporated in the battery. It is, of course, readily possible to include a plurality of battery cells series-connected to provide any desired output voltage. Battery amperage rating is dependent primarily on the area of the electrodes used, and battery service life will vary with the quantity of active material in the electrodes. These variables all should be correlated to the characteristics of the lamp filament 10, used in order to obtain maximum efficiency from the battery and electric lamp assembly.

The filament-containing chamber 4 of the lamp bulb 2 is evacuated and, if desired, filled with a suitable non-oxidizing gas such as nitrogen for example, through an exhaust tubulation 15 (FIG. 6) which extends endwise from the outer end of the chamber 4 of the bulb and which, after evacuation and, if desired, gas filling of the chamber 4, is then sealed or tipped off as indicated at 16 in FIG. 1 to thereby hermetically seal the chamber 4 from the outside atmosphere. Likewise, the battery-containing chamber 5 of the lamp bulb 2 is evacuated and, if desired, filled with a suitable inert gas such as nitrogen for example, through an exhaust tubulation 17 (FIGS. 4–6) which extends endwise from the ready-break tip end 3 of the bulb. After the evacuation and, if desired, gas filling of the bulb chamber 5, the exhaust tubulation 17 is sealed or tipped off as indicated at 18 in FIG. 1, to thereby hermetically seal the chamber 5 from the outside atmosphere. The evacuation of the chamber 5 serves to remove therefrom all traces of moisture which might otherwise result in premature activation of the battery 11.

In use, to activate the battery 11 and energize the lamp filament 10, it is merely necessary to break open the readily frangible tip end 3 of the lamp bulb 2 and immerse the lamp 1 in water. The water entering the battery-containing chamber 5 through the opening thus formed by the breakage of the tip end 3, then penetrates into and moistens the electrode separator 14 of the battery and, with the electrolyte thus provided between the electrodes 12, 13, the battery 11 will generate sufficient electric power to maintain the bulb fully lighted for approximately one-half hour or more depending on the current drawn by the lamp filament 10, the size of the battery 11, and other factors. If the material employed for the separator 14 is capable of absorbing and retaining a sufficient quantity of water, the assembly need be dipped only momentarily into the water to provide sufficient electrolyte to last throughout its service life; otherwise it is desirable to maintain the battery unit 11 imersed in water so long as light is needed.

Referring to FIGS. 2 to 8, the electric lamp 1 according to the invention can be easily and economically fabricated by first sealing a pair of lead-in wires 8 and 9 into a disc-shaped glass button 6 to form a lamp stem 19 (FIG. 2). As shown, the lead-in wires 8 and 9 extend in side-by-side relation through the glass button 6 and protrude from the opposite sides thereof. The filament 10 and battery 11 are then mounted on the lead-in wires 8, 9 at locations on opposite sides of the glass button 6 to form the lamp mount 7. The mounting of the filament 10 on the lead-in wires 8, 9 may be effected by clamping, welding, or otherwise connecting the ends of the filament to the lead-in wires 8, 9. The mounting of the battery 11 on the lead-in wires 8, 9 may be effected by soldering or brazing the electrodes 12 and 13 of the battery to respective ones of the lead-in wires 8, 9.

The lamp mount 7 formed as described above is then sealed into a tubular glass bulb 2 of the type shown in FIG. 4, provided at one end with a readily frangible or so-called ready-break tip end 3 terminating in an exhaust tubulation 17. The lamp mount 7 is sealed into the bulb 2 in a position more or less centrally thereof, as shown in FIG. 5, and with the glass button 6 disposed transversely of the tubular bulb, by suitably heating the glass wall of the bulb, as by gas fires 20 directed thereagainst at the region opposite the circular periphery of the glass button 6, to cause the bulb wall to soften and collapse inwardly against and fuse to the similarly heated and softened periphery of the glass button 6 of the lamp mount 7, thus forming a hermetic seal between the bulb wall and glass button completely around the circular extent thereof. The glass button 6 of the lamp mount 7, following the sealing thereof into the tubular bulb 2, thus forms a transverse glass wall or partition within the bulb which divides it into two separate chambers 4 and 5 within which the filament 10 and the battery 11 are respectively located.

Following the sealing of the lamp mount 7 into the bulb 2, the open end 21 of the filament-containing chamber portion 4 of the bulb is then necked down, as shown in FIG. 6, by suitably heating and softening it, as by means of gas fires directed thereagainst for example, to thereby form an exhaust tubulation 15 thereon. The chambers 4 and 5 of the bulb 2 are then exhausted through the respective tubulated ends 15 and 17 thereof and, if desired, filled with a suitable non-oxidizing gas such as nitrogen for example, following which the tubulations 15 and 17 are then suitably sealed or tipped off in the conventional manner, as by directing gas fires thereagainst, to form the exhaust tips 16 and 18 hermetically sealing off the respective chambers 4 and 5 from the outside atmosphere, thus completing the fabrication of the lamp 1. The evacuation of the chamber 5 serves to remove therefrom all the moisture which might otherwise result in premature activation of the battery 11. To this end also, any filling gas which may be introduced into the chamber 5 should be entirely free of moisture.

Because the battery 11 of the lamp according to the invention is sealed within a moisture-free or dehumidified chamber 5 which is hermetically sealed from the outside atmosphere and thereby protected against the penetration of atmospheric or other moisture thereinto, there is therefore no need for storing the lamp in a dry atmosphere in order to prevent premature activation of the battery 11 and lighting of the lamp when subjected to environments of high humidity. The lamp 1 according to the invention thus is more convenient to use and, in addition, has an indefinite shelf life. Also, the integrated battery and lamp assembly of my invention offers the important advantages of small size, light weight, reliability of operation and simplicity and economy of manufacture.

Although a preferred embodiment of my invention has been disclosed, it will be understood that the invention is not to be limited to the specific construction and arrangement of parts shown, but that they may be widely modified within the spirit and scope of my invention as defined by the appended claims.

What I claim as new and desire to secure by Letters Patent of the United States is:

1. An electric lamp comprising a glass bulb having a pair of separate hermetically-sealed chambers, a water-activated deferred action battery disposed in one of said chambers, said battery comprising positive and negative electrode members separated by an interposed separator member, a filament disposed in the other of said chambers, and a pair of lead-in wires extending into each of said chambers and connected at their opposite ends to respective ends of said filament and to respective ones of the said electrode members, said bulb having a readily frangible glass section communicating with the said one chamber to provide an opening thereinto on fracture of said section.

2. An electric lamp as specified in claim 1 wherein the said one chamber is dehumidified.

3. An electric lamp as specified in claim 1 wherein the said readily frangible glass section comprises a glass tip extension on said bulb.

4. An electric lamp as specified in claim 1 wherein the said glass bulb is of tubular shape and is provided with a transverse glass wall partition dividing the bulb into the said separate chambers and through which glass wall the said lead-in wires are sealed.

5. An electric lamp as specified in claim 4 wherein the said readily frangible glass section comprises a glass tip extension protruding endwise from that end of said bulb provided with the said one chamber.

6. The method of making a battery-powered electric lamp comprising the steps of sealing a pair of lead-in wires in a glass button so as to protrude from the opposite sides thereof, mounting a filament and a water-activated deferred action battery on said lead-in wires on opposite sides of said glass button to thereby form a lamp mount, forming a tubular glass bulb with a readily frangible open-ended tip at one end thereof and sealing the said mount into said bulb with the glass button of the mount fusion-sealed to the bulb wall to divide the bulb into two separate chambers and with the said battery located within that one of said chambers provided with the said readily frangible tip, and then evacuating the said bulb chambers through the open ends of the bulb and sealing off the said bulb ends to hermetically seal the said chambers.

References Cited
UNITED STATES PATENTS 2,063,070  12/1936  Winckler _____ 240—10.61
3,329,981   6/1965  Orsino _____ 9—8.3

DAVID J. GALVIN, *Primary Examiner.*